Feb. 16, 1926.
W. C. MAGRANIS ET AL
1,573,727
HEATING DEVICE FOR AUTOMOBILE WINDSHIELDS
Filed May 2, 1925
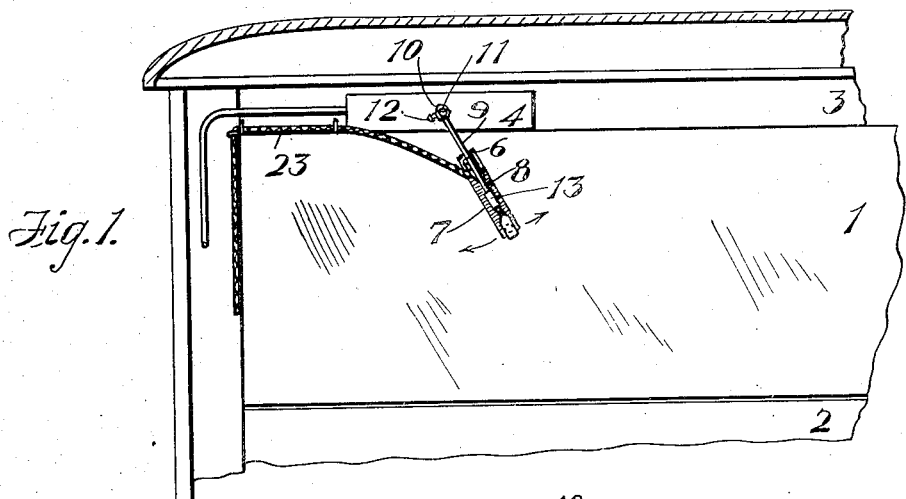
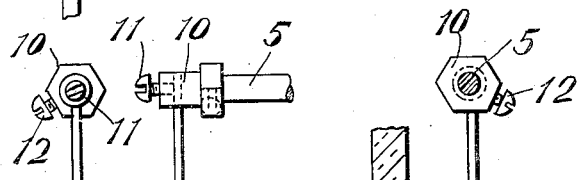
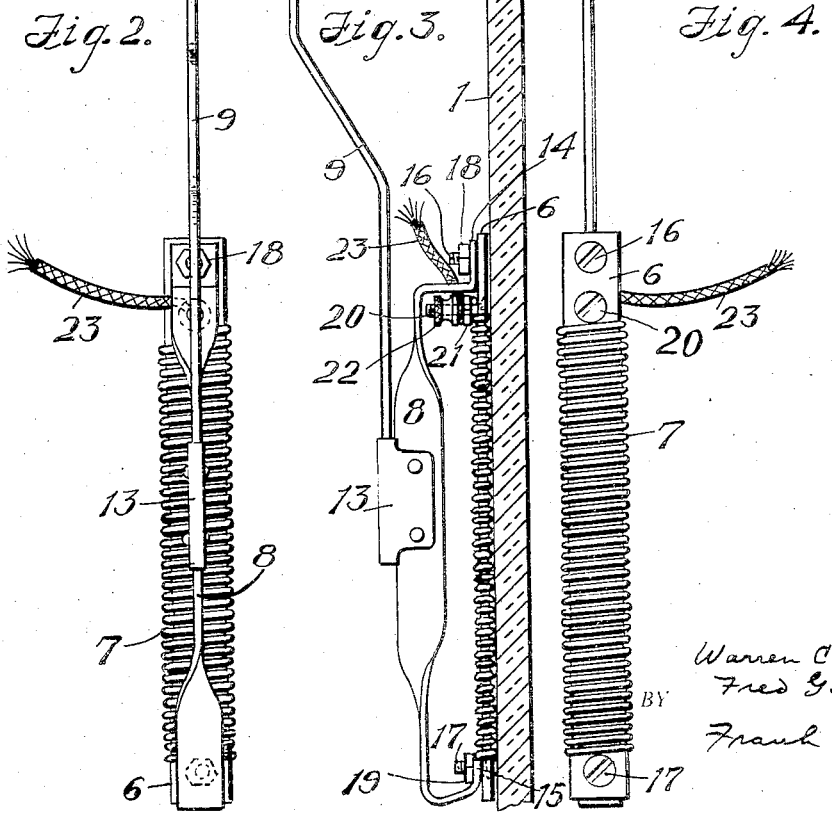
INVENTORS.
Warren C. Magranis,
Fred G. Chase,
Frank A. Cutter,
BY
ATTORNEY.

Patented Feb. 16, 1926.

1,573,727

UNITED STATES PATENT OFFICE.

WARREN C. MAGRANIS, OF NORTHAMPTON, AND FRED G. CHASE, OF MITTINEAGUE, MASSACHUSETTS.

HEATING DEVICE FOR AUTOMOBILE WINDSHIELDS.

Application filed May 2, 1925. Serial No. 27,482.

*To all whom it may concern:*

Be it known that we, WARREN C. MAGRANIS, residing at Northampton, in the county of Hampshire and State of Massachusetts, and FRED G. CHASE, residing at Mittineague, in the county of Hampden and State of Massachusetts, both citizens of the United States of America, have jointly invented a new and useful Heating Device for Automobile Windshields, of which the following is a specification.

Our invention relates to improvements in devices applicable to wind-shields, windows, and the like, whereon ice or vapor is liable to form and collect, and consists essentially of a certain peculiar heating-unit which is provided with a frame, and an arm adapted to be connected with a suitably positioned and supported spindle, such heating-unit being connected by an electrical conductor with an electric battery, such as that commonly carried by an automobile driven by an internal-combustion engine, all as hereinafter set forth.
The primary object of our invention is to produce a comparatively simple and inexpensive heating device, of the character described, which can be readily attached to the spindle of an automatic wind-shield cleaner, or to any other spindle that enables said device to be oscillated thereon or therewith close to or in direct contact with the transparent member or glass of a windshield or window, and with which the current from an electric battery is converted into heat for the purpose of warming said glass, to the end that the formation of ice or vapor thereon is prevented, or the same if already formed is dissipated therefrom.
This device, being on the inside of the wind-shield, does not interfere with the ordinary wiper on the outside of said windshield, although applied to or mounted on the same spindle upon which said wiper is mounted, and is generally used in conjunction with such exterior wiper, although it might be employed independently of or disassociated from the same. In other words, this device has no dependence on the ordinary type of wind-shield wiper.

Another object is to provide a heating device, for the wind-shields or windows of automotive vehicles and power-propelled craft, which device affords sufficient heat or warmth to dissipate or preven the formation of ice on the outside of the wind-shield or window, or vapor on the inside of the same, within the arcuate area defined by the limits or extremities of movement of the device, and even beyond such area, without heating the glass to an extent that would cause injury to the same. This last is true, because our device is so constructed that the current of electricity from the battery generates only sufficient heat, in the heating-unit of said device, to raise the temperature of the glass, with which said heating-unit is in contact, to an extent sufficient to prevent the formation thereon of ice or vapor, or to dissipate ice or steam therefrom if it has collected thereon before the current is turned on to the heating device.

Other objects and advantages will appear in the course of the following description.

We attain the objects and secure the advantages of our invention by the means illustrated in the accompanying drawings, in which—

Figure 1 is an elevation of fragmentary portions of the wind-shield and supporting parts therefor of an automobile as viewed from the interior, and of our heating device in operative position relative to said windshield; Fig. 2, a rear elevation of the heating device; Fig. 3, a side elevation of said device, and, Fig. 4, a front elevation of the device.

Similar reference characters designate similar parts throughout the several views.

The heating device illustrated in the last three views is on a much larger scale, of course, than it is in the first view.

The portions of the wind-shield appearing in Fig. 1 comprise upper and under transparent or glass plates or sections 1 and 2, respectively, which are mounted in a frame 3 of any usual construction, an automatic cleaner 4 attached to the top rail of said frame on the inside and adjacent to the left-hand end thereof, such cleaner consisting in part of a spindle which carries an oscillating wiper on the outside of said upper section, but the same is hidden by the heating device on the inside of said upper section. The aforesaid spindle appears at 5 in Figs. 3 and 4. These parts and members are shown merely to illustrate one application of our invention, it being understood, as hereinbefore intimated, that the device is not limited to use on automobiles, nor in connection with an automatic cleaner. Obviously, the device can be mounted on an independent spindle, or on a spindle which supports a hand wiper, and in either of these cases said device is operated by hand.

A portion of the upper glass plate 1 is shown in section in Fig. 3.

The heating device itself comprises a heating-unit that consists of a strip 6 of insulating material and a coil of wire 7 wound thereon, together with connections presently to be described, a support or frame 8 to which said insulating strip 6 is attached, and an arm 9 secured at one terminal to said frame and adapted to have the other terminal connected with the spindle 5.

As a convenient means for connecting the arm 9 with the spindle 5, we provide a coupling 10 and two screws 11 and 12. The coupling 10 is bored axially to receive the rear terminal of the spindle 5, and the screw 12 is tapped through said coupling, radially, in position to engage said spindle after the coupling has been placed thereon, and rigidly secure the coupling to the spindle. At the opposite end the coupling 10 is tapped axially to receive the screw 11, and has a transverse opening therethrough to receive the upper terminal of the arm 9. After the arm 9 has been inserted in the coupling 10, the screw 11 is tightened against said arm and thereby rigidly secures the same to the coupling.

The arm 9 may be more or less resilient, and the lower terminal thereof is received in and has secured thereto a clip 13 which is rigidly fastened to the frame 8 intermediate of the ends of said frame.

The end portions of the frame 8 are bent to form upper and under feet 14 and 15, respectively, to which the insulating strip 6 is attached by means of screws 16 and 17 and nuts 18 and 19. Thus the main portion or body of the frame 8 is behind and somewhat remote from the strip 6 with its coil 7. The screw 16 is passed through the strip 6 adjacent to the upper end thereof and through the foot 14, and the nut 18 is placed on said screw behind said foot and tightened to bind said strip and foot together. The screw 17 is passed through the strip 6 adjacent to the lower terminal thereof, and the nut 19 is placed on said screw and tightened against the foot 15 which is between said strip and nut, whereby said strip and foot are rigidly secured together.

A screw or binding-post 20 is passed through the strip 6 to receive thereon an ordinary nut 21 and a thumb-nut 22 behind said strip. One end of the wire 7 is hooked around the binding-post 20, behind the strip 6 and secured in place by means of the nut 21, said wire is wound around said strip in the usual manner, and the other end of the wire is clamped with the foot 15 between said strip and the nut 19. An electrical conductor 23 has one terminal wound around the binding-post 20 behind the nut 21, and is there secured by means of the thumb-nut 22 which is screwed on to said binding-post behind said terminal.

The conductor 23 extends from the heating-unit (comprising the strip 6 and winding 7, with connections), to the battery (not shown). The current from the battery passes through the conductor 23 to the binding-post 20, from the latter to and through the coil 7, from said coil to and through the screw 17 to the frame 8, and thence, by way of the arm 9 and the spindle 5, to the frame of the automobile where said current is grounded. The coil 7 affords the necessary resistance to the passage of the electric current to cause said coil to become heated to the required degree.

The coil 7 being close to or in actual contact with the glass 1, causes said glass to become heated or warmed to the extent required for the purpose of dissipating any ice or steam that may have formed or collected thereon, or to prevent the formation or collection of these elements on the glass, at least within the vicinity of said coil.

The arm 9, with its frame 8 and the heating-unit, is caused to oscillate as the spindle 5 is rocked in its bearings, first in one direction and then in the other, by means of the automatic-cleaner mechanism, with the result that a sufficient area of the plate 1 is kept clear to enable the operator to see through without obstruction. Similar results are obtained when the heating device is oscillated by the hand of the operator applied to the frame and arm of said device and moved to swing the same on or with its supporting spindle.

If an outside wiper be mounted on the spindle 5, which is assumed to be the case here, said wiper operates against the front side as the heating device operates against the back side of the glass 1.

We are aware that various kinds of electrical devices for heating or warming windshields have been previously invented, and do not, therefore, seek to claim such a device broadly; nevertheless, more or less change in the shape, size, construction, and arrangement of some or all of the parts of our device may be made without departing from the spirit of our invention or exceeding the scope of what is claimed.

What we claim as our invention, and desire to secure by Letters Patent, is—

1. The combination, in a heating device of the class described, with a spindle, of a radially perforated coupling mounted on the front end of said spindle, and provided with a radial screw to bind said coupling to said spindle, an arm having one terminal inserted in the perforation in said coupling, the latter also being provided with a screw to bind said arm thereto, a frame secured to said arm, a heating-unit secured to said frame, and an electrical conductor connected with said heating-unit.

2. A heating device, of the class described, comprising a heating-unit consisting of a bar of insulating material, a wire coil around the outside of said bar, and means to secure the ends of said coil to said bar, said means consisting in part of a binding-post for an electrical conductor, with a binding member thereon, set in said bar, and oscillatory means to support said heating-unit, at the end portion only, on the inside of a transparent member.

3. In a heating device, of the class described, an arm, a frame secured to said arm at one terminal thereof, and having feet, a bar of insulating material, members to attach said bar to said feet, a wire coil around the outside of said bar and attached at one terminal to one of said members, a binding-post passing through said bar and having the other terminal of said coil connected therewith, a nut on said binding-post bearing on said coil, a thumb-nut also on said binding-post, and an electrical conductor secured to said binding-post between said nut and thumb-nut, the construction and arrangement being such that said bar stands clear of said frame except where the bar is attached to said feet.

FRED G. CHASE.
WARREN C. MAGRANIS.